(12) United States Patent
Livingston et al.

(10) Patent No.: US 10,328,396 B2
(45) Date of Patent: Jun. 25, 2019

(54) ASYMMETRIC MEMBRANES FOR USE IN NANOFILTRATION

(71) Applicant: IP2IPO INNOVATIONS LIMITED, London (GB)

(72) Inventors: Andrew Guy Livingston, London (GB); Yogesh Suresh Bhole, London (GB)

(73) Assignee: IP2IPO Innovations Limited, London (GB)

( * ) Notice: Subject to any disclaimer, the term of this patent is extended or adjusted under 35 U.S.C. 154(b) by 0 days.

(21) Appl. No.: 15/342,424

(22) Filed: Nov. 3, 2016

(65) Prior Publication Data
US 2017/0165614 A1 Jun. 15, 2017

Related U.S. Application Data

(63) Continuation of application No. 13/810,981, filed as application No. PCT/GB2011/051361 on Jul. 19, 2011, now abandoned.

(30) Foreign Application Priority Data

Jul. 19, 2010 (GB) .................................. 1012080.6

(51) Int. Cl.
*B01D 61/02* (2006.01)
*B01D 71/62* (2006.01)
*B01D 67/00* (2006.01)
*B01D 69/02* (2006.01)
(Continued)

(52) U.S. Cl.
CPC ........... *B01D 71/62* (2013.01); *B01D 61/027* (2013.01); *B01D 67/0011* (2013.01); *B01D 67/0079* (2013.01); *B01D 67/0097* (2013.01); *B01D 69/02* (2013.01); *B01D 69/125* (2013.01); *B01D 69/141* (2013.01); *B01D 2323/30* (2013.01); *B01D 2325/022* (2013.01)

(58) Field of Classification Search
None
See application file for complete search history.

(56) References Cited

U.S. PATENT DOCUMENTS

| 2,895,948 A | 7/1959 | Brinker et al. |
| 3,313,783 A | 4/1967 | Iwakura et al. |
| 3,408,336 A | 10/1968 | Benson |

(Continued)

FOREIGN PATENT DOCUMENTS

WO    WO2006/098872    9/2006

OTHER PUBLICATIONS

Handbook of Biochemistry & Molecular Biology, 4th ed., 2010, 2 pages.*

(Continued)

*Primary Examiner* — Patrick J Orme
(74) *Attorney, Agent, or Firm* — Barnes & Thornburg LLP

(57) ABSTRACT

Improved integrally skinned asymmetric membranes for organic solvent nanofiltration, and their methods of preparation and use are disclosed. Membranes are formed from polybenzimidazoles by phase inversion and are then crosslinked by addition of crosslinking agents. These stabilize the membranes and allow solvent nanofiltration to be maintained even in the solvents from which the membranes were formed by phase inversion, and in strongly acidic and strongly basic solvents.

17 Claims, 11 Drawing Sheets

(51) Int. Cl.
*B01D 69/14* (2006.01)
*B01D 69/12* (2006.01)

(56) References Cited

U.S. PATENT DOCUMENTS

| | | | |
|---|---|---|---|
| 3,433,772 A | 3/1969 | Chenevey et al. |
| 3,509,108 A | 4/1970 | Prince |
| 3,549,603 A | 12/1970 | Chenevey et al. |
| 3,555,389 A | 1/1971 | Opal |
| 3,699,038 A | 10/1972 | Boom |
| 3,708,439 A | 1/1973 | Sayigh et al. |
| 3,720,607 A | 3/1973 | Brinegar |
| 3,737,402 A | 6/1973 | de Vries |
| 3,841,492 A | 10/1974 | Brinegar |
| 4,020,142 A | 4/1977 | Davis et al. |
| 4,154,919 A | 5/1979 | Sheratte |
| 4,312,976 A | 1/1982 | Choe |
| 4,448,687 A | 5/1984 | Wang |
| 4,532,041 A | 7/1985 | Shuey et al. |
| 4,666,996 A | 5/1987 | Sansone |
| 4,693,824 A | 9/1987 | Sansone |
| 4,693,825 A | 9/1987 | Trouw |
| 4,734,466 A | 3/1988 | Kindler et al. |
| 4,828,699 A | 5/1989 | Soehngen |
| 5,067,970 A | 11/1991 | Wang et al. |
| 5,174,899 A | 12/1992 | Bahrmann et al. |
| 5,215,667 A | 6/1993 | Livingston, Jr. et al. |
| 5,264,166 A | 11/1993 | White et al. |
| 5,288,818 A | 2/1994 | Livingston, Jr. et al. |
| 5,298,669 A | 3/1994 | Healy et al. |
| 5,360,530 A | 11/1994 | Gould et al. |
| 5,395,979 A | 3/1995 | Deckman et al. |
| 5,410,012 A | 4/1995 | Connell et al. |
| 5,494,566 A | 2/1996 | Gould et al. |
| 5,554,715 A | 9/1996 | Connell et al. |
| 5,651,877 A | 7/1997 | Gould et al. |
| 6,180,008 B1 | 1/2001 | White |
| 6,585,802 B2 | 7/2003 | Koros et al. |
| 6,623,639 B2 * | 9/2003 | Barss .............. B01D 67/0006 210/500.1 |
| 6,755,900 B2 | 6/2004 | Koros et al. |
| 6,986,844 B2 | 1/2006 | Barss et al. |
| 2003/0159980 A1 | 8/2003 | Barss et al. |
| 2005/0256296 A1 | 11/2005 | Kiefer et al. |
| 2008/0143014 A1 * | 6/2008 | Tang .............. B01D 53/228 264/216 |
| 2009/0126566 A1 | 5/2009 | Liu et al. |
| 2010/0038306 A1 * | 2/2010 | Livingston .......... B01D 61/027 210/496 |
| 2010/0244306 A1 | 9/2010 | Tang |
| 2013/0118983 A1 | 5/2013 | Livingston et al. |

OTHER PUBLICATIONS

Burgal et al., "Negligible ageing in poly(ether-ether-ketone) membranes widens application range for solvent processing," Journal of Membrane Science 525 (2017) 48-56.

* cited by examiner

ASYMMETRIC MEMBRANES FOR USE IN NANOFILTRATION

CROSS-REFERENCE TO RELATED APPLICATIONS

This application is a continuation application of U.S. application Ser. No. 13/810,981, filed on Jan. 18, 2013, which is a national stage entry under 35 U.S.C. § 371(b) of International Application No. PCT/GB2011/051361, filed Jul. 19, 2011, which claims the benefit of United Kingdom Patent Application Serial No. 1012080.6, filed Jul. 19, 2010, the entire disclosures of all of which are incorporated herein by reference.

FIELD OF THE INVENTION

The present invention relates to asymmetric membranes for nanofiltration, particularly nanofiltration of solutes dissolved in organic solvents, and particularly the nanofiltration of solutes dissolved in strongly basic and acidic organic solvent environments.

BACKGROUND TO THE INVENTION

Membrane processes are well known in the art of separation science, and can be applied to a range of separations of species of varying molecular weights in liquid and gas phases (see for example "Membrane Technology and Applications" 2$^{nd}$ Edition, R. W. Baker, John Wiley and Sons Ltd, ISBN 0-470-85445-6).

Nanofiltration is a membrane process utilising membranes whose pores are generally in the range 0.5-5 nm, and which have molecular weight cut-offs in the region of 200-2,000 Daltons. Molecular weight cut-off of a membrane is generally defined as the molecular weight of a molecule that would exhibit a rejection of 90% when subjected to nanofiltration by the membrane. Nanofiltration has been widely applied to filtration of aqueous fluids, but due to a lack of suitable solvent stable membranes has not been widely applied to the separation of solutes in organic solvents. This is despite the fact that organic solvent nanofiltration (OSN) has many potential applications in manufacturing industry including solvent exchange, catalyst recovery and recycling, purifications, and concentrations. U.S. Pat. Nos. 5,174,899 5,215,667; 5,288,818; 5,298,669 and 5,395,979 disclose the separation of organometallic compounds and/or metal carbonyls from their solutions in organic media. UK Patent No. GB2373743 describes the application of OSN to solvent exchange; UK Patent No. GB2369311 describes the application of OSN to recycle of phase transfer agents, and; EP1590361 describes the application of OSN to the separation of synthons during oligonucleotide synthesis. However, there are no reports to date describing the application of OSN in strongly basic or acidic organic solvent environments.

Polyimides have been used widely to form membranes used in separation processes, particularly gas separations, and also for separations of liquids. U.S. Pat. Nos. 5,264,166 and 6,180,008 describe processes for the production of integrally skinned asymmetric polyimide membranes. These membranes are prepared as flat sheet membranes on a supporting substrate using a phase inversion technique, which results in an ultra-thin top layer of the asymmetric membrane characterised by pore sizes below 5 nm in diameter. After formation, the membranes are treated with a non-volatile conditioning agent dissolved in solvent. The conditioning agent maintains membrane properties for nanofiltration of low molecular weight solutes from organic solvents, and allows the membrane to be processed, stored and handled in a dry state. The application of these membranes to solvent recovery from lube oil filtrates are described in U.S. Pat. Nos. 5,360,530; 5,494,566; and 5,651,877. GB 2,437,519 reports membranes formed by phase inversion of polyimide solutions, followed by crosslinking of the resulting polyimide membrane, and then treatment with a non-volatile conditioning agent dissolved in solvent. However integrally skinned polyimide membranes formed by phase inversion are not stable in all solvents, even when crosslinked according to GB 2,437,519. In particular, they are not stable in strongly basic or acidic organic environments.

Polybenzimidazole membranes have been widely reported for use in gas separations and processing of aqueous fluids. U.S. Pat. Nos. 3,699,038, 3,720,607, 3,841,492, 4,448,687 and 4,693,824 report the formation of integrally skinned polybenzimidizole membranes formed by phase inversion from a dope solution. U.S. Pat. No. 3,737,402 reports the formation of polybenzimidzole membranes by phase inversion from a dope solution, followed by annealing at temperatures of at least 135° C. to improve the reverse osmosis performance of the membranes. U.S. Pat. No. 4,693,825 reports the production of polybenzimidazole membranes from a dope solution containing benzyl alcohol as an additive.

It has been reported that crosslinking of polybenzimidizole (PBI) membranes improves their chemical resistance. U.S. Pat. Nos. 4,666,996, 6,986,844, 4,734,466, and 4,020,142 all disclose methods for the crosslinking PBI. However, these methods are known to lead to a dramatic increase in the brittleness of the membranes, making them difficult to manufacture and use.

SUMMARY OF THE INVENTION

The present invention provides asymmetric polybenzimidazole nanofiltration membranes which are particularly suitable for use in organic solvents.

In a first aspect, the invention provides a membrane for nanofiltration of a feed stream solution comprising a solvent and dissolved solutes and showing preferential rejection of the solutes at ambient temperature, comprising an integrally skinned asymmetric polybenzimidazole membrane which is impregnated with a conditioning agent.

In a particular embodiment, the polybenzimidazole is crosslinked so as to improve the chemical resistance of the membrane.

In yet a further aspect, the present invention provides the use of a polybenzimidazole membrane as defined herein for the nanofiltration of a feed stream, wherein the feed stream comprises a solvent which is strongly acidic or strongly basic and/or the feed stream comprises one or more strongly acidic or strongly basic compounds present in the solvent.

In yet another aspect, the present invention provides a method of separating dissolved solutes from a feed stream by nanofiltration, said feed stream comprising a solvent which is strongly acidic or strongly basic and/or the feed stream comprises one or more strongly acidic or strongly basic compounds present in the solvent; wherein said method comprises passing the feed through a polybenzimidazole membrane as defined herein.

In another aspect, the invention provides a process for forming an integrally skinned asymmetric polybenzimidazole membrane for solvent nanofiltration, comprising the steps of:
(a) preparing a polybenzimidazole dope solution comprising:
   (i) a polybenzimidazole polymer, and (ii) a solvent system for said polybenzimidazole which is water miscible;
(b) casting a film of said dope solution onto a supporting substrate;
(c) allowing the dope solution to evaporate over an evaporation period and then immersing the film cast on the substrate into a coagulating medium;
(d) optionally, treating the resulting asymmetric membrane with a solvent comprising one or more crosslinking agents for polybenzimidazole; and
(e) treating the asymmetric membrane with a wash bath or baths comprising a conditioning agent.

In a further aspect the present invention provides a membrane obtainable by any one of the methods defined herein.

In a further aspect the present invention provides a membrane obtained by any one of the methods defined herein.

In a further aspect the present invention provides a membrane directly obtained by any one of the methods defined herein.

Membranes of the invention can be used for nanofiltration operations in organic solvents. In particular, they can be used for nanofiltration operations in solvents in which the base polybenzimidazole is soluble. This is advantageous with respect to many of the prior art asymmetric solvent nanofiltration membranes, which lose structure and dissolve in typical dope solvents such as dimethylacetimide (DMAc), and exhibit low or no flux in some chlorinated solvents such as dichloromethane. Further, membranes of the present invention can be employed in a feed stream for nanofiltration in which the solvent is strongly acidic or basic, or in which the feed stream contains components which are strongly acidic or basic. This is advantageous with respect to the prior art asymmetric solvent nanofiltration membranes, which lose structure and dissolve under strongly acidic or basic conditions. Membranes of the present invention however are stable in these solvents, offering acceptable flux and rejections. Yet a further advantage of the membranes of the present invention is that they may exhibit higher fluxes than known membranes when mixtures of water and organic solvent are being processed.

DESCRIPTION OF VARIOUS EMBODIMENTS

Figure 1:
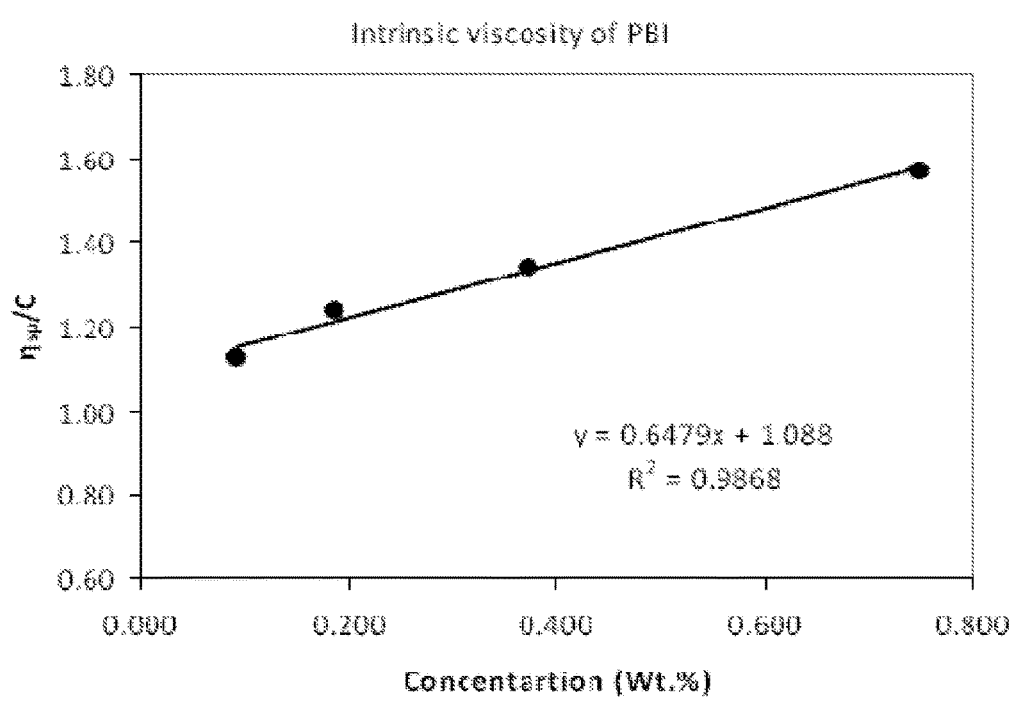
FIG. 1 shows the intrinsic viscosity of synthesised polybenzimidazole measured in dimethylacetamide at 30° C.
Figure 2:
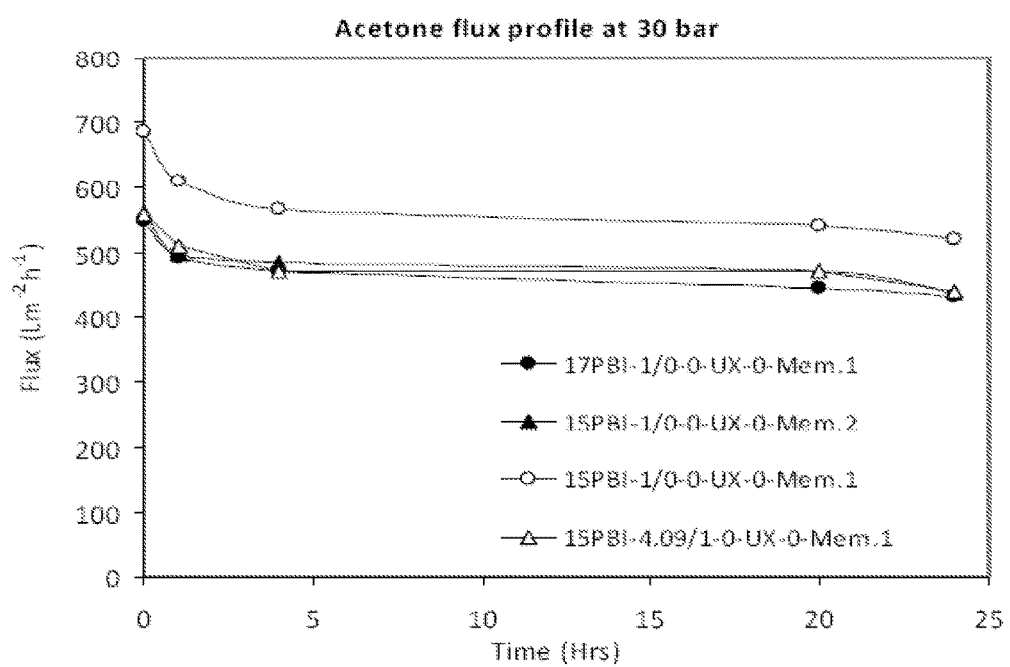
FIG. 2 shows flux for various polybenzimidazole membranes at 30 bar with a nanofiltration feed stream comprising acetone as a solvent and with polystyrene oligomers as solutes.
Figure 3:
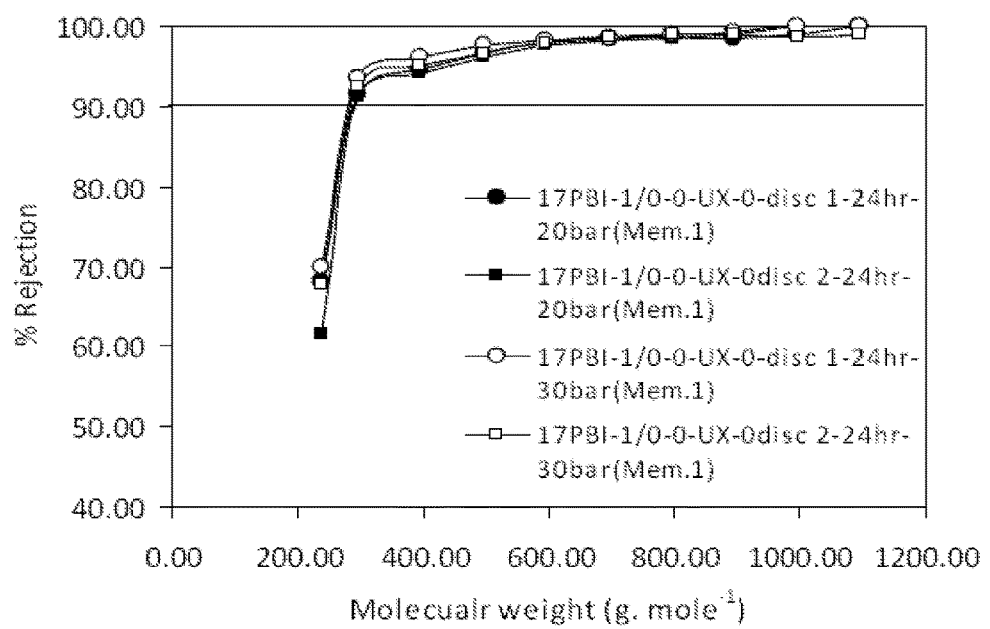
FIG. 3 shows flux and rejection data for various polybenzimidazole membranes prepared from a dope solution containing 17 wt % polybenzimidazole at 30 bar with a nanofiltration feed stream comprising acetone as a solvent and with polystyrene oligomers as solutes.
Figure 4:
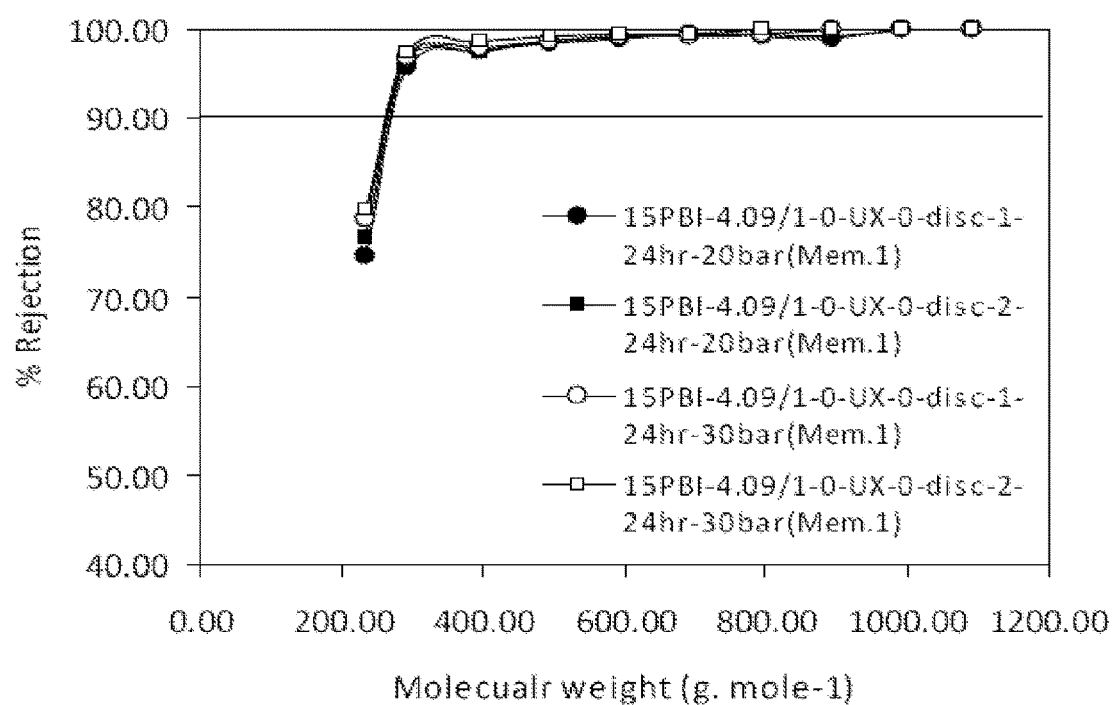
FIGS. 4(*a*) and 4(*b*) show flux and rejection data for a various polybenzimidazole membranes prepared from a dope solution containing 15 wt % polybenzimidazole at 30 bar with a nanofiltration feed stream comprising acetone as a solvent and with polystyrene oligomers as solutes.
Figure 4:
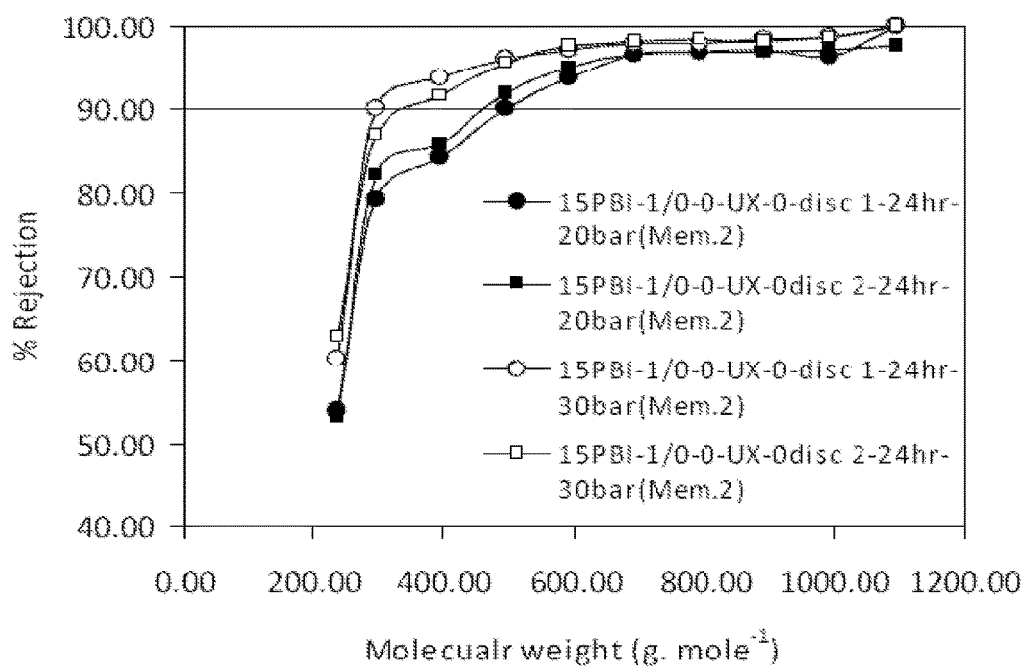
Figure 5:
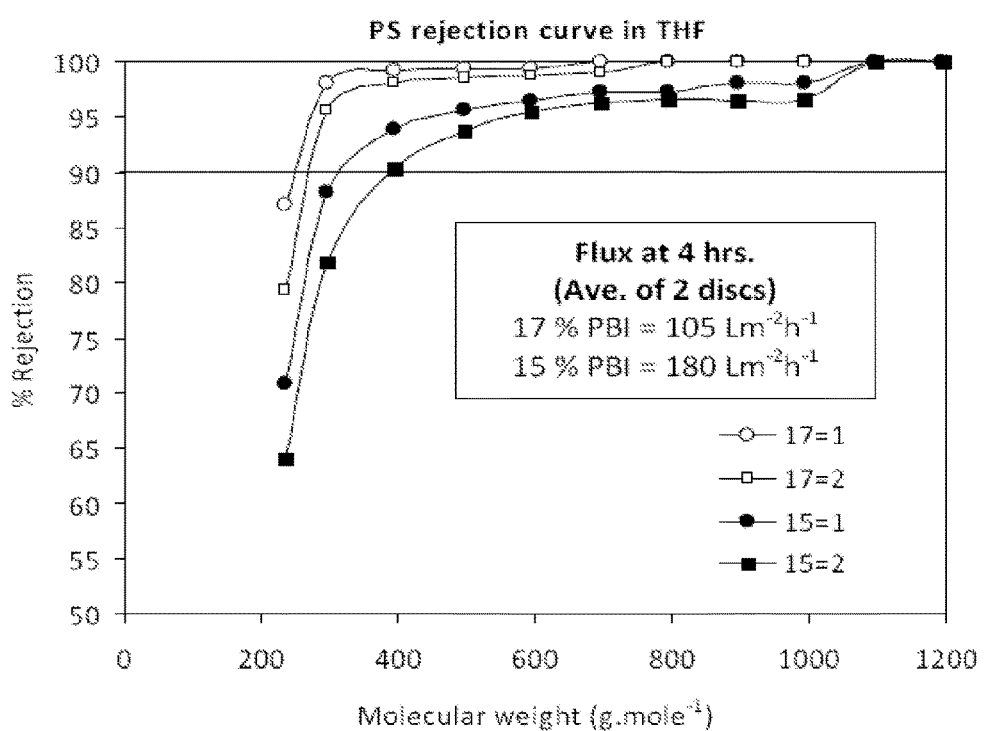
FIG. 5 shows the flux and molecular weight cut off (MWCO) curves of polybenzimidazole membranes prepared from 15 and 17 wt % dope solutions with DMAc as a solvent. Nanofiltration of a feed solution comprising polystyrene oligomers dissolved in THF has been performed at 30 bar and 30° C.
Figure 6:
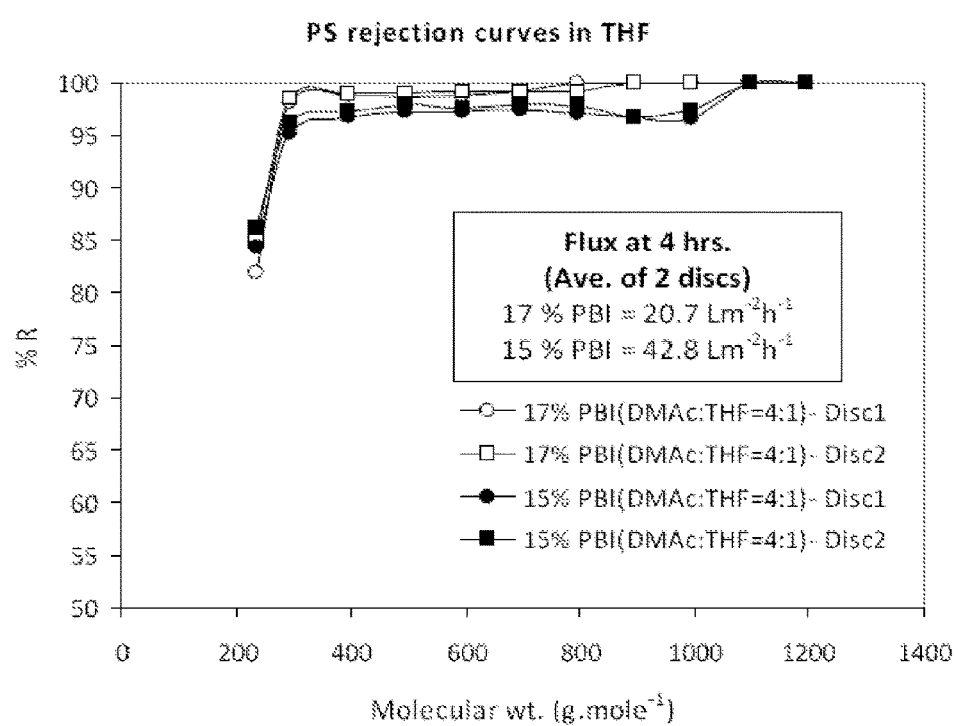
FIG. 6 shows the flux and MWCO curves of polybenzimidazole membranes prepared from 15 and 17 wt % dope solutions with a mixture of DMAc:THF at a ratio 4:1 as a solvent. Nanofiltration of a feed solution comprising polystyrene oligomers dissolved in THF has been performed at 30 bar and 30° C. (% R on the y-axis means % rejection).
Figure 7:
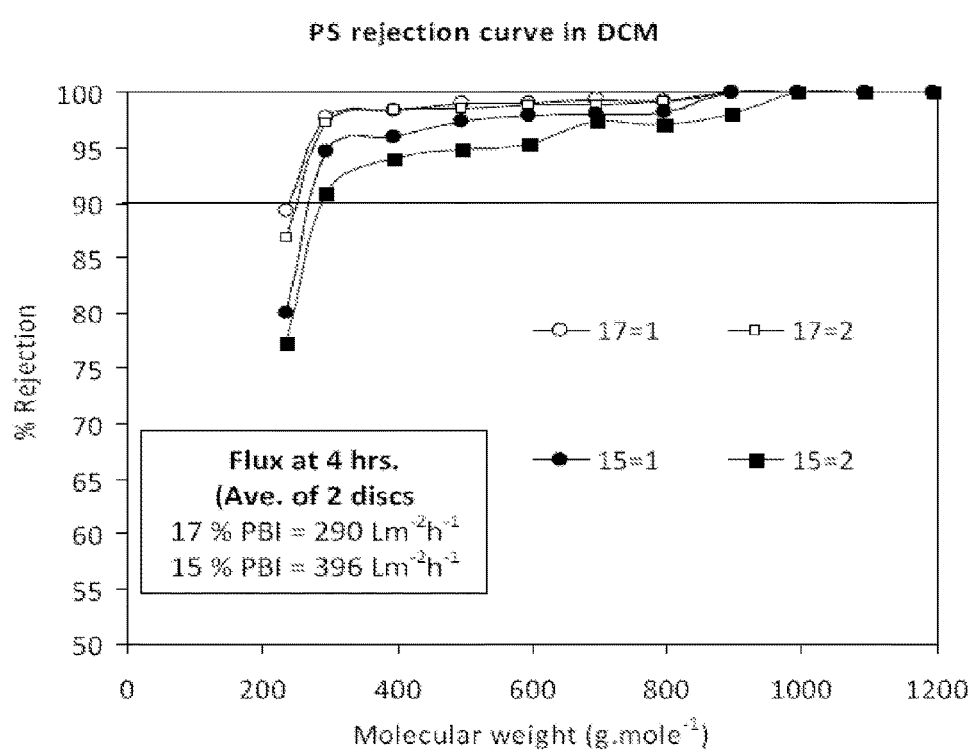
FIG. 7 shows the flux and MWCO curves of polybenzimidazole membranes prepared from 15 and 17 wt % dope solutions with DMAc as a solvent. Nanofiltration of a feed solution comprising polystyrene oligomers dissolved in dichloromethane has been performed at 30 bar and 30° C.
Figure 8:
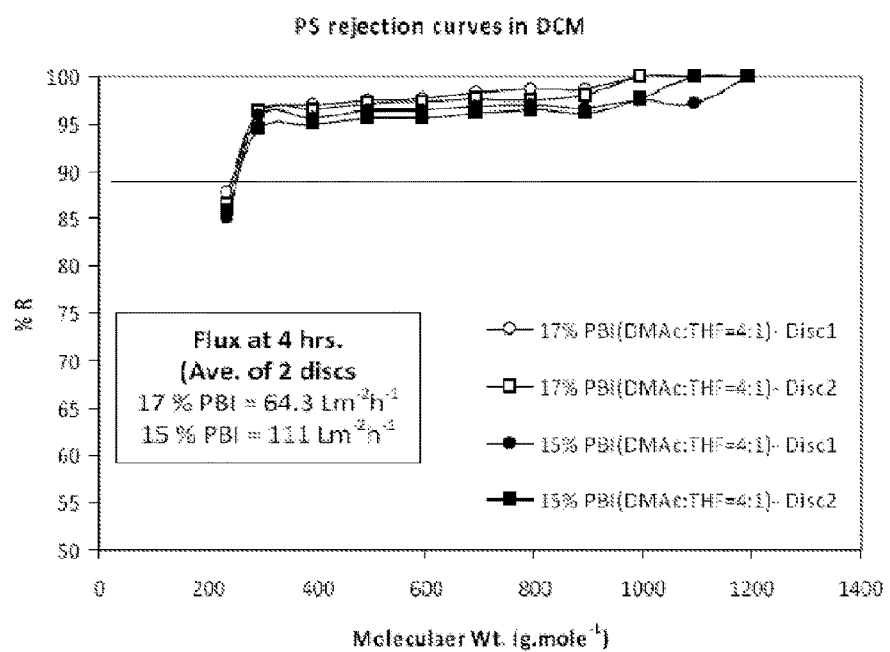
FIG. 8 shows the flux and MWCO curves of polybenzimidazole membranes prepared from 15 and 17 wt % dope solutions with a mixture of DMAc:THF at a ratio 4:1 as a solvent. Nanofiltration of a feed solution comprising polystyrene oligomers dissolved in dichloromethane has been performed at 30 bar and 30° C. (% R on the y-axis means % rejection).

Asymmetric membranes will be familiar to one of skill in this art and include an entity composed of a dense ultra-thin top "skin" layer over a thicker porous substructure of the same material, i.e. as being integrally skinned. Typically, the asymmetric membrane is supported on a suitable porous backing or support material.

Polybenzimidazole membranes of the invention can be produced from a number of polybenzimidazole polymer sources. The identities of such polymers are presented in the prior art, including U.S. Pat. Nos. 3,699,038, 3,720,607, 3,737,402, 3,841,492, 4,448,687, 4,693,824 and 4,693,825. Processes for producing suitable polybenzimidazoles are known to those skilled in the art and include those described in U.S. Pat. Nos. 2,895,948, Re 26,065, 3,313,783, 3,509, 108, 3,555,389, 3,433,772, 3,408,336, 3,549,603, 3,708,439, 4,154,919, 4,312,976, 5,410,012, 5,554,715 and in the Journal of Polymer Science, Vol 50, pages 511-539 (1961).

A preferred class of polybenzimidazole polymer useful to prepare the membranes of the invention has the following general repeat structure I shown below:

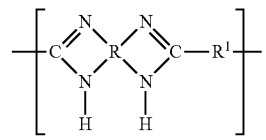

where R is a tetravalent aromatic nucleus, typically symmetrically substituted, with the nitrogen atoms forming the benzimidazole rings being paired upon adjacent carbon atoms of the aromatic nucleus, and $R^1$ is a divalent substituent selected from aliphatic, alicyclic and aromatic radicals.

Suitably, the R group in the general repeat structure I shown above has the structure shown below:

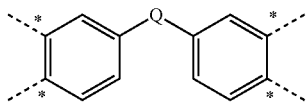

wherein Q is a direct bond between the adjacent rings or an alkylene linker and * marks the point of attachment with the N atoms of the fused imidazole rings.

In an embodiment, Q is a direct bond.

The $R^1$ substituents in the general repeat structure I can include (1) an aromatic ring, (2) an arylene group, (3) an alkylene group, (4) an arylene-ether group, and (5) a heterocyclic ring. A suitable example of an aromatic ring is phenyl. A suitable example of an arylene group is phenylene. The term "alkylene group" includes (1-20C) alkylene groups. In an embodiment, an alkylene group is a (1-6C) alkylene group. An arylene-ether group is suitably a group of the general formula III

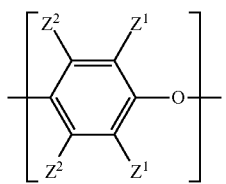

(III)

wherein each $Z^1$ or $Z^2$ group is hydrogen or a hydrocarbyl substituent group (suitably a (1-6C)hydrocarbyl group. When $R^1$ is a heterocyclic ring, it is suitably a saturated, unsaturated or partially saturated monocyclic or bicyclic ring containing 4 to 12 atoms of which 1, 2, 3 or 4 ring atoms are chosen from nitrogen, sulphur or oxygen, which ring may be carbon or nitrogen linked, wherein a —$CH_2$— group can optionally be replaced by a —C(O)—; and wherein a ring nitrogen or sulphur atom is optionally oxidised to form the N-oxide or S-oxide(s). Particular examples of heterocyclic rings include pyridine, pyrazine, furan, quinoline, thiophene, or pyran.

A further preferred class of polybenzimidazole polymers useful to prepare the membranes of the invention has the following general repeat structure II shown below:

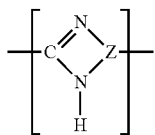

Where Z is an aromatic nucleus having the nitrogen atoms forming the benzimidazole ring paired upon adjacent carbon atoms of the aromatic nucleus. Further polybenzimidazoles useful in the invention are mixtures of polymers with structure I and polymers with structure II.

Suitably Z is a fused phenyl ring.

A preferred polybenzimidazole for forming the membranes of the invention is poly(2,2'-[m-phenylene])-5,5'-bis-benzimidazole which has the formula shown below:

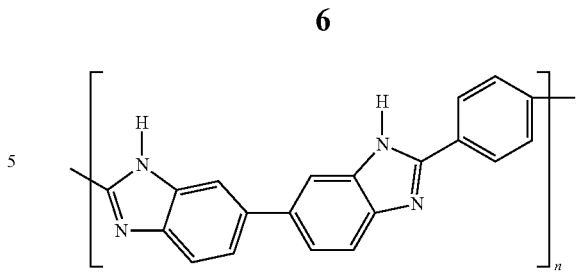

wherein n is an integer.

Suitably, n is an integer within the range of 10 to 5000, more typically 20 to 3000 and even more typically 50 to 2000.

Membranes of the invention can be made by dissolving the desired polybenzimidazole polymer in a solvent together with optional viscosity enhancers, optional void suppressors, and optionally discrete particles of an immiscible matrix, to give a viscous, polymer dope solution, spreading the solution upon a porous support to form a film, partially evaporating the solvent, and quenching the film in water. This precipitates the polymer and forms an asymmetric membrane by the phase inversion process.

The invention includes a process for forming an integrally skinned asymmetric crosslinked polybenzimidazole solvent nanofiltration membrane, comprising the steps of:

(a) preparing a polybenzimidazole dope solution consisting essentially of:
  (i) a polybenzimidazole polymer present in amounts of 5 to 30% by weight of said dope solution,
  (ii) a solvent system for said polybenzimidazole which is water miscible,
  (iii) optionally, a viscosity enhancer present in amounts less than 5 wt % of said dope solution,
  (iv) optionally, a void suppressor present in amounts of less than 10% by weight of said dope solution,
  (v) optionally, a surfactant present in amounts of less than 5% by weight of said dope solution,
  (vi) optionally, a discrete inorganic or organic matrix suspended in the dope solution at an amount of less than 20% by weight of the said dope solution;

(b) casting a film of said dope solution onto a supporting substrate;

(c) allowing the dope solution to evaporate over an evaporation period, and then immersing the film cast on the substrate into a coagulating medium;

(d) optionally, treating the resulting asymmetric membrane with a solvent comprising one or more crosslinking agents for polybenzimidazole; and;

(e) treating the asymmetric membrane with a conditioning agent.

Optionally, the membranes may be dried as a further step (f) following step (e).

The polybenzimidazole polymer dope solution may be prepared by dissolving the polybenzimidazole polymer in one or a mixture of organic solvents, including the following water-miscible solvents: N,N-dimethylacetamide, also referred to as DMAc, N-methyl-2-pyrrolidone, hereinafter referred to as NMP, tetrahydrofuran, hereinafter referred to as THF, N,N-dimethylformamide, hereinafter referred to as DMF, dimethylsulfoxide, 1,4 dioxane, gamma.-butyrolactone, water, alcohols, ketones, and formamide.

The weight percent of the polybenzimidazole polymer in solution may range from 5% to 30% in the broadest sense, although a 12% to 20% range is preferable and 14% to 18% range is even more preferred.

Additives such as viscosity enhancers may be present in amounts up to 10% by weight of the said polybenzimidazole polymer dope solution and these include polyvinyl pyrrolidones, polyethylene glycols and urethanes. Additionally additives such as void suppressors may be used in amounts up to 5% of the weight of said polybenzimidazole polymer dope solution, including maleic acid. Additives such as surfactants, which influence the pore structure, may be used in amounts up to 5% of the weight of said polybenzimidazole polymer dope solution, for example Triton X-100 (available from Sigma-Aldrich UK Ltd. (octylphenoxy-polyethoxyethanol)).

Organic or inorganic matrices in the form of powdered solids may be present at amounts up to 20 wt % of the said polymer dope solution. Carbon molecular sieve matrices can be prepared by pyrolysis of any suitable material as described in U.S. Pat. No. 6,585,802. Zeolites as described in U.S. Pat. No. 6,755,900 may also be used as an inorganic matrix. Metal oxides, such as titanium dioxide, zinc oxide and silicon dioxide may be used, for example the materials available from Evonik Degussa AG (Germany) under their Aerosol and AdNano trademarks. Mixed metal oxides such as mixtures of cerium, zirconium, and magnesium may be used. Preferred matrices will be particles less than 1.0 micron in diameter, preferably less than 0.1 microns in diameter, and preferably less than 0.01 microns in diameter. In some cases it may be advantageous to disperse the matrices in a separate solution from the dope solution, preferably an organic solvent solution, and then subsequently add this solution to the dope solution containing the polymer. In a preferred embodiment crystals or nanoparticles of an inorganic matrix, for example zeolites or metal oxides, may be grown to a selected size in a separate solution from the dope solution, and this dispersion solution subsequently added to the dope solution containing the polymer. This separate solution may comprise water or an organic solvent with nanoparticles dispersed in the continuous liquid phase. In yet a further preferred embodiment, the solvent in which the matrix is dispersed may be volatile, and it may be removed from the dope solution prior to membrane casting by evaporation.

Once the polybenzimidazole polymer is dissolved in the solvent system described, and optionally organic or inorganic matrices are added into the dope solution so that the matrices are well dispersed, it is cast onto a suitable porous support or substrate. The support can take the form of an inert porous material which does not hinder the passage of permeate through the membrane and does not react with the membrane material, the casting solution, the gelation bath solvent, or the solvents which the membrane will be permeating in use. Typical of such inert supports are metal mesh, sintered metal, porous ceramic, sintered glass, paper, porous nondissolved plastic, and woven or non-woven material. Preferably, the support material is a non-woven polymeric material, such as a polyester, polyethylene, polypropylene, polyetherether ketone (PEEK), polyphenyline sulphide (PPS), Ethylene-ChloroTriFluoroEthylene (Halar® ECTFE), or carbon fibre material.

Following the casting operation, a portion of the solvent may be evaporated under conditions sufficient to produce a dense, ultra-thin, top "skin" layer on the polybenzimidazole membrane. Typical evaporation conditions adequate for this purpose include exposure to air for a duration of less than 100 seconds, preferably less than 30 seconds. In yet a further preferred embodiment, air is blown over the membrane surface at 15° C. to 25° C. for a duration of less than 30 seconds.

The coagulating or quenching medium may consist of water, alcohol, ketones or mixtures thereof, as well as additives such as surfactants, e.g., Triton® X-100 (available from Sigma-Aldrich UK Ltd (octylphenoxy-polyethoxyethanol)). The conditions for effecting coagulation are well known to those skilled in the art.

The asymmetric polybenzimidazole membranes formed can be washed according to the following techniques. Typically a water-soluble organic compound such as low molecular weight alcohols and ketones including but not limited to methanol, ethanol, isopropanol, acetone, methylethyl ketone or mixtures thereof and blends with water can be used for removing the residual casting solvent (e.g. DMAc) from the membrane. Alternatively the membrane may be washed with water. Removal of the residual casting solvent may require successive wash blends in a sequential solvent exchange process. Both membrane efficiency (solute rejection) and permeate flow rate can be enhanced by the proper solvent exchange process.

Suitable crosslinking agents for treating the polybenzimidazole polymer described in U.S. Pat. Nos. 4,666,996, 6,986,844, 4,734,466, and 4,020,142, and all are incorporated herein. These include multifunctional alkyl halides, divinyl sulfones, and strong polyfunctional organic acids.

Multifunctional alkyl halides include those containing at least two halide substituents, and with the general structure:

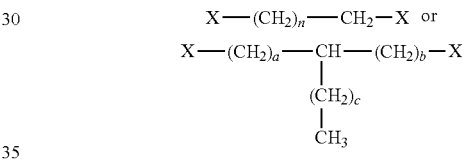

where X is Br or Cl, n is 1 to 11, a is 1 to 10, b is 0 to 4, and c is 0 to 6. A preferred class of difunctional alkyl halides comprises straight chain, terminally di-substituted compounds having the structure $X-(CH_2)_n.CH_2-X$ where X and n are as defined above. A most preferred difunctional alkyl halide is dibromobutane (DBB). The alkyl halide may also contain three or more halide substituents. Exemplary alkyl halides with three or more halide substituents include tribromopropane, trichloropropane, pentaerythrityl tetrabromide, and pentaerythrityl tetrachloride.

Further suitable crosslinking agents include divinyl sulfones with the general formula

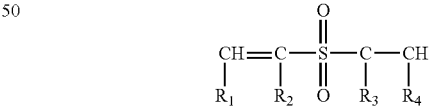

wherein each of $R_1$-$R_4$ is the same or different and is selected from H or $C_1$-$C_3$ alkyl.

Strong polyfunctional organic acids suitable for use in the present invention include carboxylic acids, sulfonic acids, sulphuric acid or phosphoric acid. Representative examples are perfluoroglutaric acid, benzene hexacarboxylic acid, benzene pentacarboxylic acid, 1,2,3,4-benzenetetracarboxylic acid, 1,2,3,5-benzenetetracarboxylic acid, 1,2,4,5-benzenetetracarboxylic acid, 1,3,5-benzenetricarboxylic acid, dibromosuccinic acid, polyacrylic acid, 1,4,5,8-naphthalenetetracarboxylic acid, 2,6-naphthalenedisulfonic acid, aryl-sulfonic acids, aryl-sulfinic acids, aryl-phosphinic acids, aryl-phosphonic acids. Suitable solvents for crosslinking polybenzimidazole using strong polyfunctional organic acids are known to those skilled in the art and include glacial acetic acid.

The crosslinking agent may be dissolved in a solvent to form a crosslinking solution. The solvent can be an organic solvent chosen from ketones, ethers, alcohols, acids or any solvent that dissolves the crosslinking agent. In a preferred embodiment, the solvent in the crosslinking solution will also swell the asymmetric membrane to allow good penetration of the crosslinking agent into the membrane.

The solvent used to dissolve the alkyl halide should not react with the alkyl halide and should not dissolve the uncrosslinked PBI membrane. Preferred solvents include ketones, such as acetone, methyl isobutyl ketone (MIBK), methyl ethyl ketone (MEK), and pentanone; and ethers, such as isopropyl ether and butyl ether.

The solvent used to dissolved the divinylsufone may optionally also comprise a strong base catalyst, including alcohol metal hydroxides such as sodium and potassium hydroxide, alcohol metal alkoxides having from one to six alkyl carbon atoms such as sodium methoxide, sodium ethoxide, and alkyl aryl amine hydroxides such as particularly preferred benzyl trimethyl ammonium hydroxide. The base catalyst is generally added in amounts ranging from about 5 percent to 150 percent based upon the total weight of the divinylsufone which is added. The preferred range is about 25 to about 50 percent by weight.

The concentration of crosslinking agent in the crosslinking solution can be adjusted with respect to the quantity of polybenzimidazole asymmetric membrane to be added per volume of solution, in order to control the extent of crosslinking that takes place, so that the ratio between reactive groups in the crosslinking agent and polybenzimidazole amine hydrogen groups in the membrane treated is in the range 0.01 to 100, preferably in the range 0.01 to 10 and yet more preferably in the range 0.1 to 5.

The time for crosslinking can be varied between 0.01 and 120 hours, more preferably between 0.5 and 60 hours. The temperature of the crosslinking can be varied between 0° C. and the boiling point of the solvent, preferably between 0° C. and 150° C., yet more preferably between 50° C. and 120° C.

The asymmetric membrane is then conditioned by contacting the membrane with a conditioning agent dissolved in a solvent to impregnate the membrane. The conditioning agent is a low volatility organic liquid. The conditioning agent may be chosen from synthetic oils (e.g., polyolefinic oils, silicone oils, polyalphaolefinic oils, polyisobutylene oils, synthetic wax isomerate oils, ester oils and alkyl aromatic oils), mineral oils (including solvent refined oils and hydroprocessed mineral oils and petroleum wax isomerate oils), vegetable fats and oils, higher alcohols (such as decanol, dodecanol, heptadecanol), glycerols, and glycols or derivatives thereof (such as polypropylene glycols, polyethylene glycols, polyalkylene glycols or derivatives thereof). Suitable solvents for dissolving the conditioning agent include alcohols, ketones, aromatics, hydrocarbons, or mixtures thereof. The use of a conditioning agent in accordance with the invention allows a suitable pore structure to be maintained in a dry state, and produces a flat sheet membrane with improved flexibility and handling characteristics. Prior to use, the conditioning agent must be flushed from the membrane, i.e. the conditioning agent of this invention serves the purpose of maintaining the desired membrane structure to preserve the performance characteristics when the membrane is in the dry state, and it is not a component of the functional membrane when used for the purpose of solvent nanofiltration. This contrasts the conditioning agents of the present invention from agents that become part of the functional membrane.

Following treatment with the conditioning agent, the membrane is typically dried in air at ambient conditions to remove residual solvent.

Heat treatment may also be used to increase the membrane rejection of solutes. After the conditioning step, the membrane may be heated to between 150° C. and 300° C. for between 1 minute and 2 hours.

Membranes of the invention can be used for nanofiltration operations, particularly in organic solvents. By the term "nanofiltration" it is meant a membrane process which will allow the passage of solvents while retarding the passage of larger solute molecules, when a pressure gradient is applied across the membrane. This may be defined in terms of membrane rejection $R_i$, a common measure known by those skilled in the art and defined as:

$$R_i = \left(1 - \frac{C_{P,i}}{C_{R,i}}\right) \times 100\% \quad (1)$$

where $C_{P,i}$=concentration of species i in the permeate, permeate being the liquid which has passed through the membrane, and $C_{R,i}$=concentration of species i in the retentate, retentate being the liquid which has not passed through the membrane. It will be appreciated that a membrane is selectively permeable for a species i if $R_i>0$. It is well understood by those skilled in the art that nanofiltration is a process in which at least one solute molecule i with a molecular weight in the range 200-2,000 g mol$^{-1}$ is retained at the surface of the membrane over at least one solvent, so that $R_i>0$. Typical applied pressures in nanofiltration range from 5 bar to 50 bar.

The term "solvent" will be well understood by the average skilled reader and includes an organic or aqueous liquid with molecular weight less than 300 Daltons. It is understood that the term solvent also includes a mixture of solvents.

By way of non-limiting example, solvents include aromatics, alkanes, ketones, glycols, chlorinated solvents, esters, ethers, amines, nitriles, aldehydes, phenols, amides, carboxylic acids, alcohols, furans, and dipolar aprotic solvents, water, and mixtures thereof.

By way of non-limiting example, specific examples of solvents include toluene, xylene, benzene, styrene, anisole, chlorobenzene, dichlorobenzene, chloroform, dichloromethane, dichloroethane, methyl acetate, ethyl acetate, butyl acetate, methyl ether ketone (MEK), methyl iso butyl ketone (MIBK), acetone, ethylene glycols, ethanol, methanol, propanol, butanol, hexane, cyclohexane, dimethoxyethane, methyl tert butyl ether (MTBE), diethyl ether, adiponitrile, N,N dimethylformamide, dimethylsulfoxide, N,N dimethylacetamide, dioxane, nitromethane, nitrobenzene, pyridine, carbon disulfide, tetrahydrofuran, methyltetrahydrofuran, N-methyl pyrrolidone, acetonitrile, water, and mixtures thereof.

The membranes of the present invention are particularly suited to nanofiltration operations in which the solvent is strongly acidic or basic, or in which the feed stream contains components which are strongly acidic or basic.

The term "strongly acidic" is used herein to refer to a compound which has a pKa of less than 5. The term "strongly basic" is used herein to refer to a compound which has a pKa of greater than 9. The strongly acidic or basic compound may be a solvent and/or a compound dissolved in a solvent.

By way of non-limiting example, specific strongly basic solvents include amines, in particular alkanolamines, alkyl amines, and polyamines, such as alkyl diamines, alkyl triamines, piperidine and derivatives including alkylated piperidine, pyridine and alkyl pyridines including alkyl, dialkyl and trialkyl pyridines, and including and including ethyl amine, ethylenediamine, diethylenetriamine, triethylenetetramine, monomethylamine, mimethylamine trimethylamine, monoethylamine, diethylamine, triethylamine, isopropylamine, diisopropylamine, mono-n-propylamine, di-n-propylamine, tri-n-propylamine, di-n-butylamine, tri-n-butylamine, cyclohexylamine, dicyclohexylamine, dimethylcyclohexylamine, pentamethyldiethylenetriamine, pentamethyldipropylenetriamine, tetramethyldipropylenetriamine, benzyldimethylamine, tetramethylbis(aminoethyl)ether, N,N-dimethyl-2(2-aminoethoxy)ethanol, 3-amino propanol, N-ethylmethylamine, 2-ethoxy ethylamine N,N-diethylhydroxylamine, N-ethyl-N-(1,2-dimethylpropyl) amine, diisopropylmethylamine, 2-ethylhexylamine, dimethylbutyl amine, 3-methoxypropylamine, 3-(2-ethylhexoxy)-1-propanamine, methylaminopropylamine, dimethylaminopropylamine, methoxypropylamine, 3-ethoxy propylamine, N,N-diisopropylethylamine, dimethylisopropylamine, bis-2-ethylhexylamine, diethylmethylamine, N-methylisopropylamine, dibenzyl hydroxyl amine, monoethanolamine, diethanolamine, triethanolamine, dimethylethanolamine, N-methyldiethanolamine, monomethylethanolamine, 2-(2-aminoethoxy)ethanol, polyoxyalkyleneamines, monopropanol amines, morpholine, N-methylmorpholine, N-ethylmorpholine, N-methylmorpholine oxide, aminopropylmorpholine, quinoline, and solutions of alcohol metal alkoxides having from one to six alkyl carbon atoms such as sodium methoxide, sodium ethoxide, and alkyl aryl amine hydroxides such as particularly preferred benzyl trimethyl ammonium hydroxide.

By way of non-limiting example, specific strongly acidic solvents include carboxylic acids and their derivatives, incorporating trifluoroacetic acid and acetic acid.

Solvent can be understood to mean solvents, acidic solvents or basic solvents and mixtures thereof.

The term "solute" will be well understood by the average skilled reader and includes an organic molecule present in a liquid solution comprising a solvent and at least one solute molecule such that the weight fraction of the solute in the liquid is less than the weight fraction of the solvent, and where the molecular weight of the solute is at least 20 g mol$^{-1}$ higher than that of the solvent.

The membrane of the present invention can be configured in accordance with any of the designs known to those skilled in the art, such as spiral wound, plate and frame, shell and tube, and derivative designs thereof.

The following Examples illustrate the invention.

In Examples 1-4, a laboratory scale cross-flow nanofiltration unit was used with 4 cross flow cells. Membrane discs, of active area 14 cm$^2$, were cut out from flat sheets and placed into 4 cross flow cells in series. A feed solution consisting of <1 wt % of test solutes was charged into a 5 L feed tank and re-circulated at a flow rate of 1.5 L min$^{-1}$ using a diaphragm pump (Hydra-Cell, Wanner, USA). Pressure in the cells was generated using a backpressure regulator which was located down-stream of a pressure gauge. The pressure drop across the 4 cells was measured to be less than 0.5 bar. The re-circulating liquid was kept at 30° C. by a heat exchanger. During start-up, the conditioning agent was removed by re-circulating pure solvent for an hour without applying any pressure and discarding the initial permeate. During operation, permeate samples were collected from individual sampling ports for each cross-flow cell and the retentate sample was taken from the feed tank. Pre-conditioning of the membranes was necessary to reduce the effects of compaction to achieve steady state fluxes and rejections. The solvent flux $N_v$ was calculated from the equation:

$$N_v = \frac{V}{At} \quad (2)$$

Where V=volume of a liquid sample collected from the permeate stream from a specific cross-flow cell, t=time over which the liquid sample is collected, A=membrane area.

A feed solution consisting of a homologous series of styrene oligomers was used to obtain the MWCO curve during nanofiltration with polystyrene solutes. The styrene oligomer mixture contained a mixture of 1 g of PS580 and PS1050 (purchased from Polymer Labs, UK) and 0.1 g of α-methylstyrene dimer (purchased from Sigma Aldrich, UK). The styrene oligomers were all fully soluble in the tested solvents at this concentration Example 1

Polybenzimidazole polymer was synthesised as follows.

625 gm of Polyphosporic acid (PPA) was weighted in a 1 liter 3 neck round bottom flask at room temperature followed by the fixing of flask to the overhead stirring assembly equipped with oil bath. The oil was heated to 155° C., at around 125° C. the addition of tetra-amine was started under the constant flow of dry nitrogen. The addition was very slow in such a way that it lasted for more than 15 minutes. After the completion of tetraamine addition the temperature was further raised to 170° C. and kept constant for 45 minutes flowed by diacid addition. The reaction was further kept stirring for next 4 hrs at 170° C. After 4 hrs the reaction temperature was further raised to 210° C. for next 2.5 hrs followed by 230° C. for 2 hrs. At the end of reaction the viscous polymer solution was poured in large excess of water in the form of fine continuous fiber.

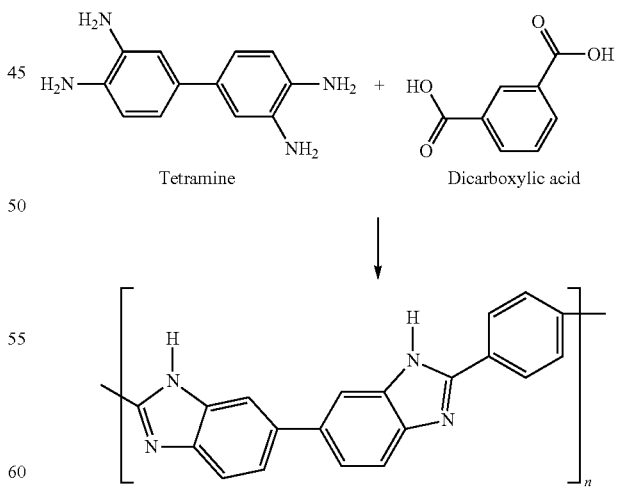

The crude PBI fibers were crushed in to fine pieces and further processed with sodium bicarbonate solution to neutralise the phosphoric acid. The fine chopped fibers were crushed in mixture to make fine powder. The fine powder of the polymer was washed further with water followed by acetone and dried in vacuum oven overnight. The dry polymer was further purified by dissolving the polymer in hot dimethylacetamide (DMAc) followed by centrifuge and precipitation in large excess of water. The precipitated polymer was washed with water for 3 times and crushed in to fine powder. The fine powder of the polymer was soaked into acetone to replace water absorbed in the polymer followed by drying in vacuum oven at 120° C. overnight.

The polymer which had been synthesised was characterised as follows:

The synthesised PBI was characterised by GPC for molecular weight determination, as shown below in Table 1:

TABLE 1

| Entry No. | % yield | Mw | Mn | Polydispersity (Mw/Mn) | IV (dl · g−1)** |
|---|---|---|---|---|---|
| Batch 1* | 93 | 324889 | 190578 | 1.7 | 1.08 |

The intrinsic viscosity of the polymer was determined by the dilute solution method using DMAc as a solvent at 30° C., and is shown in FIG. 1.

Membranes were fabricated from the polybenzimidazole polymer as follows:

Membranes were formed using the prepared polymer. The dope solution composition was as given in Table 2. The high molecular weight of the starting polymer limited the dope solution concentration to 15 wt.-17 wt % % of polymer. The weighed quantity of the DMAc was taken in flask and heated to 80° C. first, once the temperature of the solvent attained desired temperature the purified polymer was added to the flask. The dissolution of the polymer at high temperature resulted in a highly viscous polymer solution without any residue. After the complete dissolution of the polymer the heating was removed to cool the dope solution. Once the dope solution was cooled it was transferred to a 50 ml centrifuge tube to centrifuge the dope solution at 7000 rpm for 30 minutes. The dope solution was allowed to stand overnight to allow disengagement of any air bubbles. The details of membrane casting conditions are also given in Table 2.

TABLE 2

| Entry No. | Polymer (Wt. %) | Solvent used | Volatile non-solvent used | Solvent/non-solvent ratio | Evaporation time (sec) | Membrane code |
|---|---|---|---|---|---|---|
| 1 | 17 | DMAc | — | 1/0 | 60 | 17PBI-1/0-0-UX-0-Mem.1 |
| 2 | 17 | DMAc | THF | 4.09/1 | 60 | 17PBI-4.09/1-0-UX-0-Mem.1 |
| 3 | 15 | DMAc | — | 1/0 | 60 | 15PBI-1/0-0-UX-0-Mem.2 |
| 4 | 15 | DMAc | THF | 4.09/1 | 60 | 15PBI-4.09/1-0-UX-0-Mem.1 |

The coding used to designate the membranes were as follows, i.e 15PBI-1/0-0-UX-0 stands for

| Polymer Wt. % | Solvent/ Non-solvent ratio | Annealing Temp. (° C.) | UX-uncrosslinked X- crosslinked | Temperature used crosslinking |
|---|---|---|---|---|

The dope solution was used to cast films 250 μm thick on a polypropylene backing material using an adjustable casting knife on an automatic film applicator (Braive Instruments). Solvent was allowed to evaporate from the surface of the film at controlled time intervals after which the film was immersed, parallel to the surface, into a precipitation water bath at room temperature. The membranes were subsequently immersed in solvent exchange baths of isopropanol, to remove residual DMAc and water. Following this, the membrane was immersed into a bath of IPA/polyethylene glycol 400 (40/60, v/v %) to prevent drying out. The membranes were then air dried to remove excess solvent.

The membranes were then tested for flux and rejection in crossflow nanofiltration. The data from these tests are shown in FIGS. 2-8.

Example 2

Membranes were formed as in Example 1 above and then crosslinked as follows.

The membranes were immersed into a bath of methyl isobutyl ketone and crosslinker (dibromobutane) for 12 hrs. at 60° C. temperature. The membrane was then removed from the crosslinking bath and washed with IPA to remove any residual crosslinker. Following this, the membrane was immersed into a bath of IPA/polyethylene glycol 400 (40/60, v/v %) to prevent drying out. The membranes were then air dried to remove excess solvent. The dried membrane was fixed to the glass plate with the help of PVC tape and heated in oven at 100° C. for 1 hr.

Figure 9:
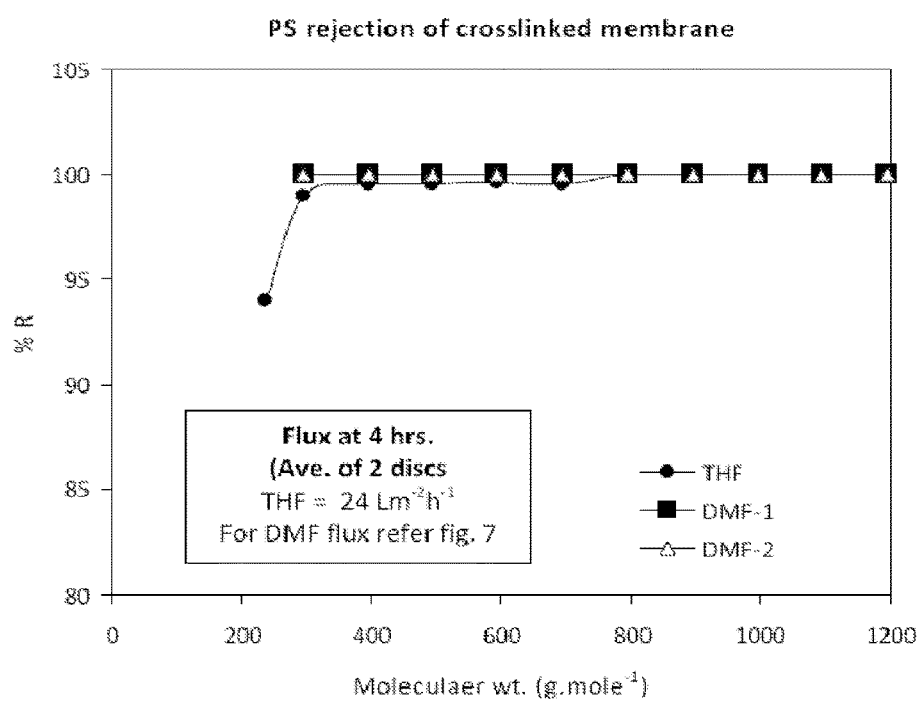
FIG. 9 shows the flux and MWCO curves of crosslinked polybenzimidazole membranes prepared from 17 wt % dope solutions with a DMAc as a solvent. Nanofiltration of feed solutions comprising polystyrene oligomers dissolved in THF and DMF has been performed at 30 bar and 30° C. (% R on the y-axis means % rejection).
Figure 10:
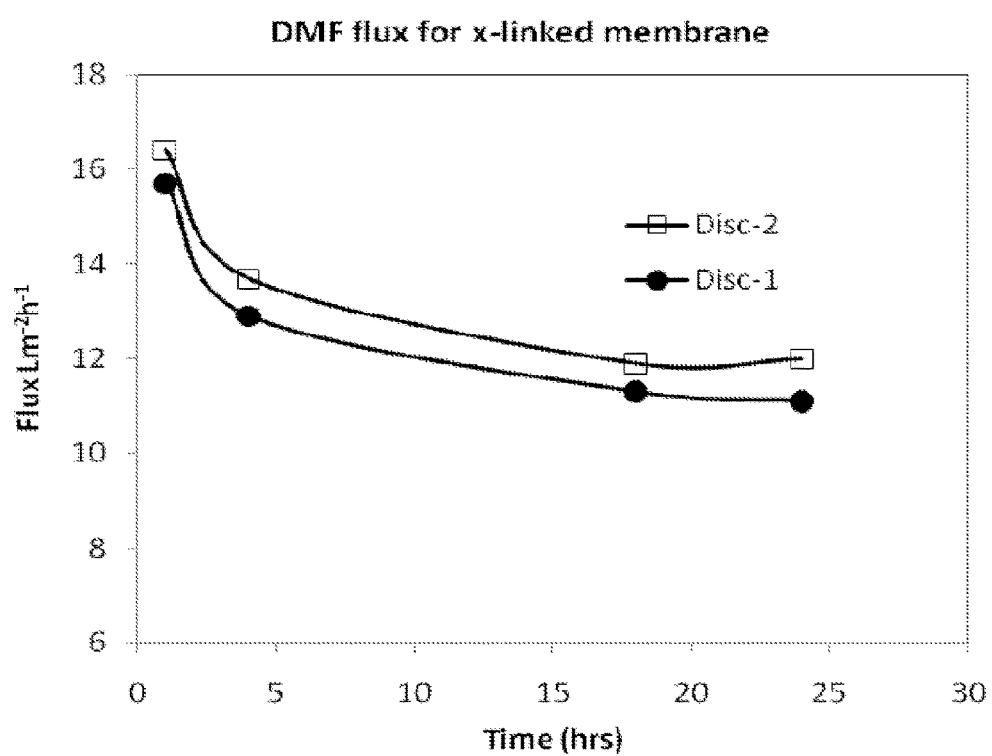
FIG. 10 shows the flux versus time for crosslinked polybenzimidazole membranes prepared from 17 wt % dope solutions with a DMAc as a solvent. Nanofiltration of feed solutions comprising polystyrene oligomers dissolved in DMF has been performed at 30 bar and 30° C.

These crosslinked membranes were then tested for flux and rejection as described above. The data from these tests is shown in FIGS. 9 and 10.

Example 3

Crosslinked polybenzimidazole membranes were prepared as per Example 2 and were immersed into undiluted solutions of monoethanolamine and trifluoroacetic acid and held at 30° C. The membranes were monitored for stability over 4 weeks. No change in the membranes appearance or properties was observed.

Example 4

Crosslinked polybenzimidazole membranes were prepared as per Example 2. These were used to test nanofiltration of a solution containing a photoresist material supplied by TOKYO OHKA KOGYO EUROPE B.V catalogue number TFR 970 dissolved at 1 g L$^{-1}$ in a mixture of Butyl diglycol:Monoethanolamine:Water (60:20:20). The membranes showed a positive rejection for the Photoresist (PR) as shown in Table 3 below:

TABLE 3

Performance evaluation of crosslinked PBI membranes for separation of PR in BDG:MEA:Water

| Entry No | Membrane used | Flux at 4 hrs (lm$^{-2}$h$^{-1}$) | PR rejection (%) | MWCO* |
|---|---|---|---|---|
| 1 | PBI-15-Crosslinked (YB) | 15 (at day 3) | 70 (at day 3) | 395 |
| 2 | PBI-17-Crosslinked (YB) | 10.5 (at day 1) | 85.2 (at day 1) | 236 |

*MWCO of the membrane based on standard PS rejection analysis after 24 hrs of filtration

The invention claimed is:

1. A membrane suitable for nanofiltration of a feed stream solution comprising N,N-dimethylformamide and dissolved solutes and having a molecular weight cut off of 200-2000 g/mol at ambient temperature, comprising an integrally skinned asymmetric crosslinked polybenzimidazole cast film membrane, wherein the membrane is impregnated with a conditioning agent, and wherein the conditioning agent maintains the pore structure of the membrane prior to its use for nanofiltration.

2. The membrane according to claim 1, wherein the polybenzimidazole membrane comprises a polybenzimidazole polymer that is poly(2,2'-[m-phenylene])-5,5'-bis-benzimidazole.

3. A membrane according to claim 1, wherein the membrane comprises crosslinks formed from the reaction of polybenzimidazole with dibromobutane, tribromopropane, trichloropropane, pentaerythrityl tetrabromide, pentaerythrityl tetrachloride, divinyl sulfones, perfluoroglutaric acid, benzene hexacarboxylic acid, benzene pentacarboxylic acid, 1,2,3,4-benzenetetracarboxylic acid, 1,2,3,5-benzenetetracarboxylic acid, 1,2,4,5-benzenetetracarboxylic acid, 1,3,5-benzenetricarboxylic acid, dibromosuccinic acid, polyacrylic acid, 1,4,5,8-naphthalenetetracarboxylic acid, 2,6-naphthalenedisulfonic acid, aryl-sulfonic acids, aryl-sulfinic acids, aryl-phosphinic acids, and aryl-phosphonic acids.

4. A method of separating dissolved solutes from a feed stream by nanofiltration, said method comprising the step of passing the feed stream through a polybenzimidazole membrane as claimed in claim 1.

5. A process for forming the integrally skinned asymmetric crosslinked polybenzimidazole cast film membrane of claim 1, said process comprising the steps of:
   (a) preparing a polybenzimidazole dope solution comprising:
      (i) a polybenzimidazole polymer, and (ii) a solvent system for said polybenzimidazole which is water miscible;
   (b) casting a film of said dope solution onto a supporting substrate;
   (c) allowing the dope solution to evaporate for an evaporation period, and then immersing the film cast on the supporting substrate into a coagulating medium;
   (d) treating the resulting asymmetric membrane with a solvent comprising one or more cross-linking agents for polybenzimidazole; and
   (e) treating the asymmetric membrane with a conditioning agent, wherein the polybenzimidazole dope solution in step (a) comprises about 14% to about 18% by weight of the polybenzimidazole polymer; and
   step (d) is conducted at a temperature of about 50° C. to about 120° C.

6. A process according to claim 5, further comprising step (f) drying the membrane.

7. A process according to claim 5, wherein the process further comprises a step of heating the membrane to about 150° C. or higher.

8. A process according to claim 5, wherein the polybenzimidazole is poly(2,2'-[m-phenylene])-5,5'-bis-benzimidazole.

9. A process according to claim 5, wherein the polybenzimidazole dope solution further comprises a viscosity enhancer in amounts of up to 10% by weight of said dope solution.

10. A process according to claim 5, wherein the polybenzimidazole dope solution further comprises a void suppressor used in amounts up to 5% of the weight of said polybenzimidazole dope solution.

11. A process according to claim 5, wherein the conditioning agent is selected from one or more of synthetic oils, mineral oils, vegetable fats and oils, higher alcohols, glycerols, and glycols.

12. A process according to claim 5 in which the cross-linking agent is chosen from multifunctional alkyl halides, divinyl sulfones, perfluoroglutaric acid, benzene hexacarboxylic acid, benzene pentacarboxylic acid, 1,2,3,4-benzenetetracarboxylic acid, 1,2,3,5-benzenetetracarboxylic acid, 1,2,4,5-benzenetetracarboxylic acid, 1,3,5-benzenetricarboxylic acid, dibromosuccinic acid, polyacrylic acid, 1,4,5,8-naphthalenetetracarboxylic acid, 2,6-naphthalenedisulfonic acid, aryl-sulfonic acids, aryl-sulfinic acids, aryl-phosphinic acids, and aryl-phosphonic acids.

13. A process according to claim 12, wherein the multifunctional alkyl halide is a di- or tri-functional alkyl halide.

14. A process according to claim 5, wherein the cross-linking agent is dissolved in a solvent selected from the group consisting of ketones, ethers, carboxylic acids and alcohols.

15. A process according to claim 5, wherein the quantity of crosslinking agent used to treat the polybenzimidazole membrane is adjusted so that the reactive groups in the crosslinking agent and polybenzimidazole amine hydrogen groups in the membrane treated is in the range between 0.1 to 10.

16. A process according to claim 5, wherein the polybenzimidazole dope solution comprises one or more solvents chosen from N-methyl-2-pyrrolidone, tetrahydrofuran, N,N-dimethylformamide, dimethylsulfoxide, N,N-dimethylacetamide, 1,4 dioxane and gamma-butyrolactone.

17. A membrane according to claim 1, wherein the conditioning agent is selected from one or more of synthetic oils, mineral oils, vegetable fats and oils, higher alcohols, glycerols, and glycols.

* * * * *